US011790120B2

(12) United States Patent
Arnott et al.

(10) Patent No.: US 11,790,120 B2
(45) Date of Patent: Oct. 17, 2023

(54) SYSTEM AND METHOD FOR ENCRYPTING STORAGE MEDIUMS WITH AN ENCRYPTION CHIP

(71) Applicant: Bank of America Corporation, Charlotte, NC (US)

(72) Inventors: Amy L. Arnott, Charlotte, NC (US); Sarah G. Troxler, Charlotte, NC (US); Allison Dolores Baker, Charlotte, NC (US); Michael R. Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/214,223

(22) Filed: Mar. 26, 2021

(65) Prior Publication Data

US 2022/0309189 A1  Sep. 29, 2022

(51) Int. Cl.
*G06F 21/72* (2013.01)
*H04L 9/30* (2006.01)
*G06F 21/60* (2013.01)

(52) U.S. Cl.
CPC ............ *G06F 21/72* (2013.01); *G06F 21/602* (2013.01); *H04L 9/30* (2013.01)

(58) Field of Classification Search
CPC .......... G06F 21/72; G06F 21/602; H04L 9/30
See application file for complete search history.

(56) References Cited

U.S. PATENT DOCUMENTS

| | | | |
|---|---|---|---|
| 7,051,932 B2 * | 5/2006 | Fernandes | G06K 7/084 235/487 |
| 7,172,112 B2 | 2/2007 | Bonalle et al. | |
| 7,543,739 B2 | 6/2009 | Brown et al. | |
| 7,580,898 B2 | 8/2009 | Brown et al. | |
| 7,864,994 B2 | 1/2011 | Fidrich et al. | |
| 8,571,195 B2 | 10/2013 | Pasi et al. | |
| 8,571,995 B2 | 10/2013 | Spies | |
| 8,666,823 B2 | 3/2014 | Spies et al. | |
| 9,038,886 B2 | 5/2015 | Hammad | |
| 9,105,027 B2 | 8/2015 | Hammad et al. | |

(Continued)

OTHER PUBLICATIONS

Poole, Nick. "Credit Card Skimmers Evolved: Shimming." SparkFun, 30, Apr. 2018, sparkfun.com/news/2673 (Year: 2018).*

*Primary Examiner* — Theodore C Parsons
*Assistant Examiner* — Alan L Kong

(57) ABSTRACT

A system for producing and transmitting encrypted data from data encoded on a storage medium comprises an apparatus configured to receive the storage medium and an encryption chip communicatively coupled to the apparatus. The apparatus comprises a processor, a memory, and a network interface. The processor is configured to receive data encoded into the storage medium, and to decode the received data as the storage medium is at least partially inserted into the apparatus. The processor is further configured to transmit the received data to the memory for storage. The encryption chip comprises an encryption processor configured to access the received data stored in the memory of the apparatus and encrypt the received data with an algorithm to produce the encrypted data. The processor then transmits the encrypted data to an external server communicatively connected to a communication network.

15 Claims, 3 Drawing Sheets

(56) References Cited

U.S. PATENT DOCUMENTS

| | | |
|---|---|---|
| 9,576,159 B1 | 2/2017 | Templeton et al. |
| 9,773,243 B1 | 9/2017 | Spies |
| 9,864,994 B2 | 1/2018 | Huang |
| 9,881,298 B2 | 1/2018 | Flitcroft et al. |
| 10,007,910 B2 | 6/2018 | von Mueller et al. |
| 10,049,360 B2 | 8/2018 | Hammad |
| 10,068,231 B2 | 9/2018 | Lewis et al. |
| 10,275,756 B2 | 4/2019 | Uzo |
| 10,445,716 B1 | 10/2019 | Riechers et al. |
| 10,474,850 B1* | 11/2019 | Post ............... G06Q 20/341 |
| 10,528,941 B2 | 1/2020 | Sandeløv et al. |
| 10,558,964 B2 | 2/2020 | Bedier et al. |
| 10,748,146 B2 | 8/2020 | Carr et al. |
| 10,762,196 B2 | 9/2020 | Cat et al. |
| 10,878,418 B2 | 12/2020 | Hamilton et al. |
| 2004/0210448 A1 | 10/2004 | Breck et al. |
| 2006/0049255 A1 | 3/2006 | von Mueller et al. |
| 2006/0049256 A1* | 3/2006 | von Mueller ......... G07F 7/1008 705/64 |
| 2007/0241183 A1 | 10/2007 | Brown et al. |
| 2007/0284434 A1 | 12/2007 | Fletcher |
| 2008/0201264 A1 | 8/2008 | Brown et al. |
| 2008/0203163 A1* | 8/2008 | Wakabayashi ....... G06K 7/0008 235/475 |
| 2009/0173790 A1* | 7/2009 | Hart ..................... G06K 7/084 235/449 |
| 2011/0238581 A1* | 9/2011 | Severson ............ G06Q 20/367 705/65 |
| 2013/0179351 A1 | 7/2013 | Wallner |
| 2013/0254117 A1 | 9/2013 | von Mueller et al. |
| 2015/0302413 A1 | 10/2015 | Dua |
| 2018/0046948 A1 | 2/2018 | Ray et al. |
| 2018/0150663 A1* | 5/2018 | Akahane ............ G06K 7/10009 |
| 2018/0357627 A1 | 12/2018 | Chen et al. |
| 2019/0147197 A1 | 5/2019 | Razaghi |
| 2019/0197814 A1* | 6/2019 | Senguttuvan ......... G07F 7/1025 |
| 2020/0074469 A1 | 3/2020 | Quigley et al. |
| 2020/0090153 A1 | 3/2020 | Hafemann et al. |
| 2020/0104845 A1 | 4/2020 | Riechers et al. |
| 2020/0160355 A1 | 5/2020 | Zovi et al. |
| 2020/0219102 A1 | 7/2020 | Varma et al. |
| 2020/0250641 A1 | 8/2020 | Tsou et al. |
| 2020/0250673 A1 | 8/2020 | Botros et al. |
| 2020/0258065 A1 | 8/2020 | Matson et al. |
| 2020/0356992 A1 | 11/2020 | Quigley et al. |
| 2021/0019729 A1 | 1/2021 | Omojola et al. |
| 2021/0073763 A1* | 3/2021 | Gonzales ............ G06Q 20/3276 |
| 2022/0164552 A1* | 5/2022 | Aiyoshi ............... G06K 7/0091 |

\* cited by examiner

| Encrypted Data 114 | Unencrypted Data 112 |
|---|---|
| kMgJDrggu5099aycVkUMh3Vk+v5KpR9Vlj5nFRQ2nZc | First Name and Last Name |
| H2tReQLzyMMxaKpAzWzwaUniE8WhIkfLftcfWLWmlJY | Account Number |
| 0VwmVHEAUQ7UTuE1g91+cfl3OJY31wk/C7MsF2WsQnk | Expiration Date |
| Ro7O1vqo281LcWB//9I59uMq6hcgYVAyl/8O6CoVm+s | Security Code |
| aXj+pqTEiN+dIgouiAJv8h7x3teRx4Gium3NXaC4rOo | Zip Code |

# SYSTEM AND METHOD FOR ENCRYPTING STORAGE MEDIUMS WITH AN ENCRYPTION CHIP

TECHNICAL FIELD

The present disclosure relates generally to encrypting data received from a storage medium. More particularly, in certain embodiments, the present disclosure is related to a system for encrypting and transmitting data encoded on the storage medium with an encryption chip.

BACKGROUND

Users often complete transactions by inserting an object into an apparatus capable of receiving the object, where the object includes a storage medium, and where the apparatus is configured to access the storage medium. There have been situations where a user's personal data contained in the storage medium has been stolen by a third party. It is not uncommon for the third party to obtain the user's personal data directly through the apparatus. For example, the third party may incorporate a reader into the apparatus that can access the personal data stored in the apparatus.

SUMMARY

The present disclosure provides for a system for producing and transmitting encrypted data from data encoded on a storage medium. As a storage medium is inserted into an apparatus configured to receive data from the storage medium, a processor processes the received data and transmits the received data for storage. An encryption chip associated with the apparatus can access the stored, received data and encrypt the data with an algorithm to produce encrypted data. The encrypted data is then transmitted to an external server for further operations.

In an embodiment, a system for producing and transmitting encrypted data from data encoded on a storage medium comprises an apparatus configured to receive the storage medium and an encryption chip communicatively coupled to the apparatus. The apparatus comprises a processor, a memory, and a network interface. The processor is communicatively coupled to the memory and configured to receive data from the storage medium, wherein the received data is encoded into the storage medium and decode the received data as the storage medium is at least partially inserted into the apparatus. The processor is further configured to transmit the received data to the memory for storage. The encryption chip comprise an encryption processor configured to access the received data stored in the memory of the apparatus and encrypt the received data with an algorithm to produce the encrypted data. The processor of the apparatus is further configured to transmit the encrypted data to an external server communicatively connected to a communication network.

Previous technology used for receiving and processing the data from the storage medium suffers from disadvantages. For example, this disclosure recognizes that additional components can be coupled to the apparatus, by a third-party bad actor, operable to access the stored data. Further, a third-party bad actor can be capable of intercepting the data as it is being sent to the external server. In an example, it is not uncommon for a third-party bad actor to couple an external device (e.g., a card skimmer) to a card reader or point-of-sale device operating as the disclosed apparatus to obtain the data stored within the apparatus. The third-party bad actor may use the obtained data to the detriment of each user associated to that data. For example, the third-party bad actor can use the personal and financial information that is stored as the data for that actor's own payment transactions. In another example, the third-party bad actor may gain access to the data transmission between the apparatus and the external server to view, copy, reroute, or combinations thereof, the data being transmitted. As the data being transmitted in conventional systems is unencrypted, anyone may be able to view and utilize that data once accessed. In this example, the third-party bad actor can remotely attack the network security between the apparatus and the external server. Depending on how secure the network security is, the data transmission can be susceptible to the third-party bad actor.

Certain embodiments of this disclosure provide unique solutions to the technical problems identified above by providing a system for producing and transmitting encrypted data. For example, the disclosed system provides several technical advantages, which include: 1) incorporating an existing apparatus with a shim and an encryption chip; 2) increasing the data security between the apparatus and an external server operable to receive data from the apparatus; and 3) options for optimizing the configuration of the encryption chip with the apparatus. The disclosed system may inhibit an external device from obtaining the data by physically introducing a shim into a slot of the apparatus to prevent access to a potential external device (e.g., a card skimmer). Typically, the external device would be temporarily disposed within the slot until a third-party bad actor removes the device. As the shim is incorporated into the slot in the disclosed system, the external device would not be able to effectively couple to the apparatus and access the stored data.

Further, the disclosed shim is associated with an encryption chip operable to encrypt the data received from each storage medium inserted into the shim. Even if the third-party bad actor obtains access to the data stored in the apparatus with the implementation of the shim in the disclosed system, the third-party bad actor would not be able to utilize that data as the system is operable to encrypt the data to be stored locally within the apparatus prior to transmitting the data to the external server. The third-party bad actor would receive encrypted data, which adds a layer of protection to the data as the third-party bad actor would be unable to decrypt the data to a usable format. By encrypting the data locally within the apparatus prior to transmitting it to the external server, there is a decrease in accessibility and utilization of the data by a third-party bad actor. As such, this disclosure may improve the function of computing systems used to produce and transmit encrypted data from data received by an apparatus.

In some embodiments, improvements provided by this disclosure are incorporated into the practical application of an apparatus comprising a shim associated with an encryption chip to protect the data and personal information embedded in communications as well as to protect the underlying computing and networking hardware from unauthorized access. The shim may allow for retrofitting an existing apparatus with an encryption chip. The encryption chip may encrypt existing data local to the apparatus prior to the apparatus transmitting the data over a communication network to an external server. A system of the apparatus and encryption chip provides for additional security against attempts to intercept and receive the data from the apparatus from devices, such as card skimmers.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
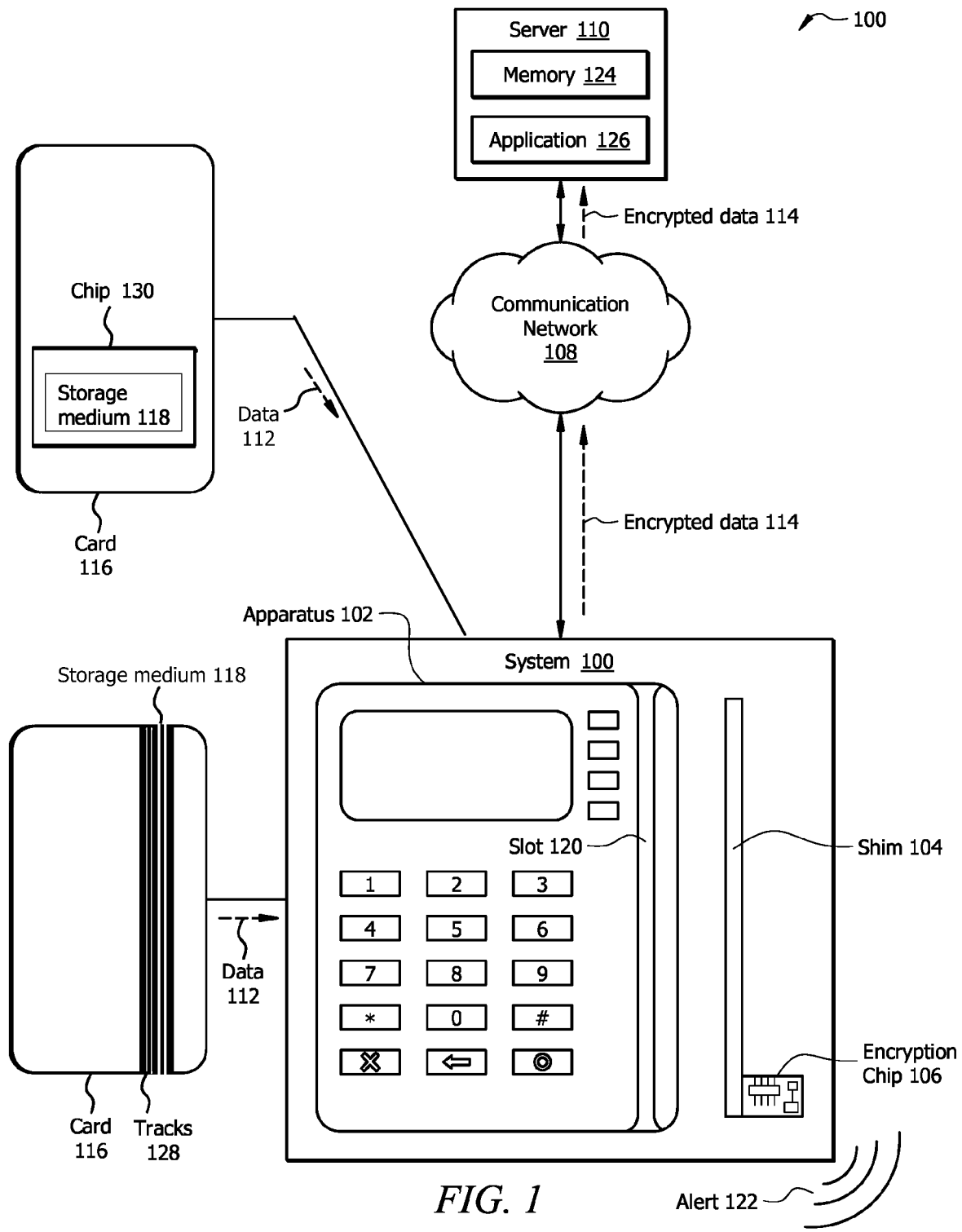
FIG. 1 is a schematic diagram of an example system for producing and transmitting encrypted data.
Figures 2, 3:
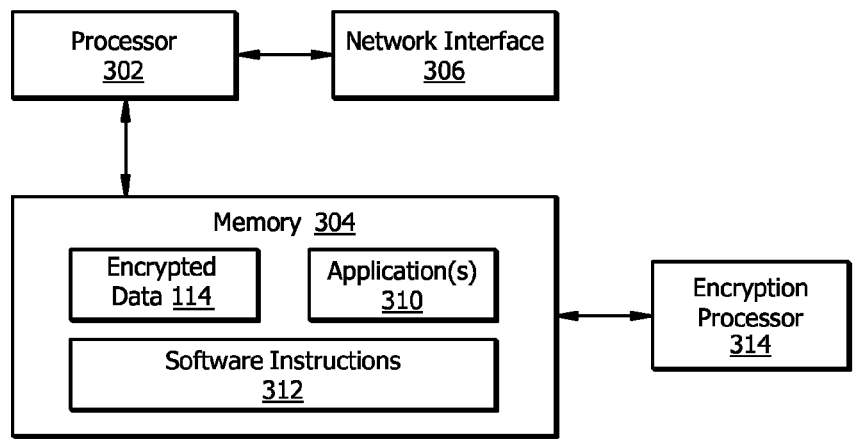
FIG. 2 is a schematic diagram of the example received data and encrypted data of FIG. 1.
FIG. 3 is a block diagram of an example apparatus of the system of FIG. 1.
Figure 4:
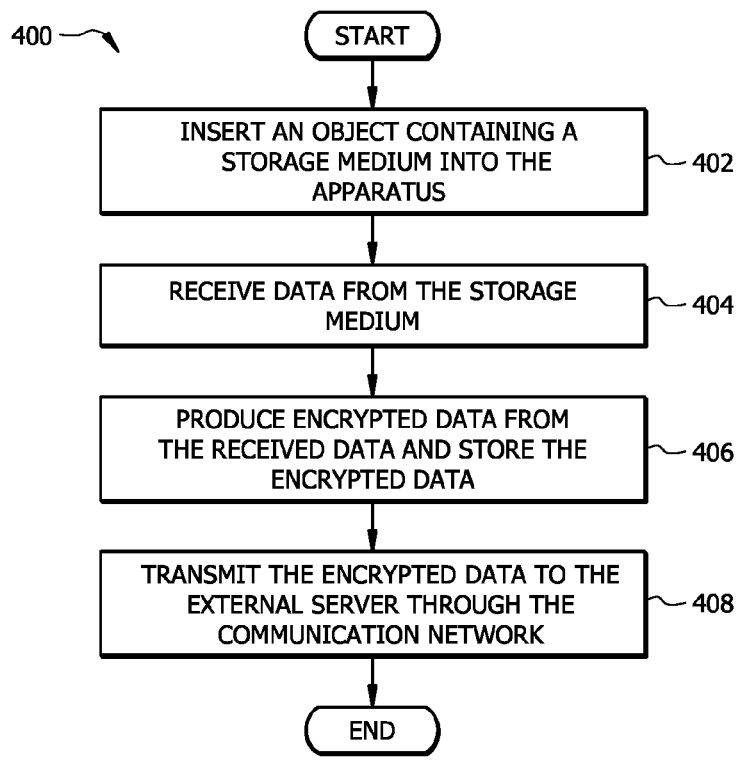
FIG. 4 is a flow diagram illustrating an example operation of the system of FIG. 1.

This disclosure provides solutions to the aforementioned and other problems of previous technology by producing encrypted data from the received data and transmitting the encrypted data to an external server. FIG. 1 is a schematic diagram of an example system for producing and transmitting encrypted data. FIG. 2 is a schematic diagram of the example encrypted data of FIG. 1. FIG. 3 is a block diagram of an example apparatus of the system of FIG. 1. FIG. 4 is a flow diagram illustrating an example operation of the system of FIG. 1.

Example System for Producing and Transmitting Encrypted Data

FIG. 1 illustrates a schematic diagram of an example system 100 for producing and transmitting encrypted data. The system 100 may include an apparatus 102, a shim 104, and an encryption chip 106. The system 100 may be communicatively coupled to a communication network 108 and may be operable to transmit encrypted data to an external server 110 through the communication network 108. In general, the apparatus 102 may be fitted with the shim 104 and encryption chip 106, which may be removably coupled to the apparatus 102. In turn, the shim 104 may receive an external object comprising a storage medium (e.g., a credit or debit card that is inserted into the shim 104). The encryption chip 106 may be removably coupled to or otherwise associated with the shim 104 and may provide important data and network security to apparatus 102, such as by encrypting data received from the storage medium. For example, the apparatus 102 may receive data 112 from the storage medium as the object is at least partially inserted into the shim 104, encrypt the received data 112 with the encryption chip 106 to produce encrypted data 114, and transmit the encrypted data 114 to the external server 110 through the communication network 108 to be stored for subsequent use.

The apparatus 102 may generally be any suitable computing device operable to receive an object, such as a card 116 (e.g., a credit card, debit card, or any other suitable payment card), comprising a storage medium 118 and to process data contained within the storage medium 118. For example, the apparatus 102 may be a card reader or other point-of-sale device that includes a user interface (e.g., a touchscreen, a display and keypad, and/or the like) operable to provide user input and display data. The apparatus 102 may be configured to transmit signals to communicatively connect to the communication network 108; to receive, process, and store data 112 from the storage medium 118; to transmit encrypted data 114 to the external server 110; and any combinations thereof. The apparatus 102 may comprise a slot 120 disposed at any suitable location on the apparatus 102 configured to receive the storage medium 118 as the card 116 is at least partially inserted into the apparatus 102. The slot 120 may be disposed vertical in relation to the apparatus 102, horizontal in relation to the apparatus 102, or some combination thereof. An example apparatus 102 and its operations using a respective processor, memory, and interface is described below with respect to FIGS. 3-4.

The shim 104 may generally be any suitable structure configured to be disposed within the slot 120 of the apparatus 102. In certain embodiments, the shim 104 may be removably coupled to the apparatus 102. In a particular example, an authorized user may determine whether or not to decouple the shim 104 from the apparatus 102. As the shim 104 is disposed within the slot 120, the shim 104 may be operable to receive the card 116 containing the storage medium 118 when the card 116 is at least partially inserted into the slot 120. The shim 104 may generally comprise the same shape as, or mirror, the shape of the slot 120. The length and width of the shim 104 may be suitably sized to fit within the slot 120. For example, the shim 104 may be less than or equal to the length and width of the slot 120. In embodiments wherein the length and/or width of the shim 104 is equal to that of the slot 120, the shim 104 may comprise an elastic material that is capable of bending or deforming to fit within the slot 120. Without limitations, the shim 104 may be disposed within and secured to the slot 120 through the use of any suitable means, including fasteners, snap-fit means, reactionary spring forces, adhesives, brazing, or any combinations thereof.

The encryption chip 106 may generally be any suitable computing device operable to implement various instructions, such as to process and encrypt data. For example, the encryption chip 106 may include one or more processors comprising electronic circuitry. The encryption chip 106 may be configured to transmit signals to communicatively connect to the apparatus 102; to receive, process, and encrypt data; to produce an alert 122; and any combinations thereof. In a particular embodiment, the encryption chip 106 may be associated with the shim 104, whereby coupling the shim 104 to the apparatus 102 indirectly incorporates the encryption chip 106 with the apparatus 102. In alternate embodiments, the encryption chip 106 may be directly incorporated into the apparatus 102. The encryption chip 106 may be configured to be communicatively coupled to the apparatus 102 through a wired or wireless connection.

The communication network 108 may facilitate communication between the system 100 and the external server 110. This disclosure contemplates the communication network 108 being any suitable network operable to facilitate communication between the system 100 and the external server 110. Communication network 108 may include any interconnecting system capable of transmitting audio, video, signals, data, messages, or any combination of the preceding. Communication network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The external server 110 is generally a suitable server (e.g., including a physical server and/or virtual server) operable to store data in a memory 124 and/or provide access to application(s) 126 or other services. For example, the external server 110 may be a database operable to receive the encrypted data 114 from the system 100. By receiving the data 112 contained within each storage medium 118 in an encrypted state (as encrypted data 114) transmission between the system 100 and the external server 110 may mitigate potential attempts to intercept and utilize information stored as the data 112. The data stored in the memory 124 may be encrypted data 114 to be viewed or accessed by a user who has been preapproved to have access to this data. While the encrypted data 114 may be accessible to a preapproved user, the user may not be able to utilize the encrypted data 114 until the encrypted data 114 has been decrypted. The application(s) 126 of the external server may be any suitable application which may be employed to review and/or access the encrypted data 114. For example, the application(s) may comprise suitable decryption protocols and algorithms to be used to decrypt the encrypted data 114. The decryption protocols and algorithms may correspond to the encryption algorithm used to produce the encrypted data 114. The process of decrypting the encrypted data 114 may transform the encrypted data 114 back to the data 112, wherein the data 112 may be in a readable and/or usable format to the user. In examples, the decryption process may be performed locally in the external server 110, remotely from the external server 110, or combinations thereof. The external server 110 may be accessed using the example apparatus 102 and its operations using a respective processor, memory, and interface is described below with respect to FIGS. 3-4.

Example Operation of the System

The apparatus 102 of the system 100 may be disposed about any suitable location for convenience to the user to complete a transaction. For example, the apparatus 102 may be a card reader or other point-of-sale device disposed at a gas station pump and operable to complete the transaction of a user paying for the gas station pump to dispense a flow of gasoline. In this example, it is not uncommon for a third-party bad actor to have previously coupled an external device (e.g., a card skimmer) to the apparatus 102 to obtain the data 112 within the storage medium 118 of each card 116 inserted into the apparatus 102. The third-party bad actor may use the data 112 to the detriment of each user associated to that data 112. The system 100 may inhibit an external device from obtaining the data 112 by physically introducing the shim 104 into the slot 120 to prevent access to a potential external device and by encrypting the data 112 received by each storage medium 118. Even if the third-party bad actor obtains access to data stored in the apparatus 102 with the implementation of the shim 104 in the system 100, the third-party bad actor would not be able to utilize that data as the system 100 is operable to encrypt the received data 112. While the present example is directed to the use at a gas station pump, the system 100 is not limited to this use. In other examples, the system 100 may be utilized to prevent a third-party bad actor from obtaining the data 112 at any suitable location where card readers or other point-of-sale devices may be used, such as at automated teller machines (ATMs), payment kiosks, portable card readers, and the like.

In an example operation of the system 100, as illustrated in FIG. 1, a user may insert the card 116 containing the storage medium 118 into the apparatus 102. The card 116 may be at least partially inserted into the slot 120 of the apparatus 102. In one or more embodiments, the shim 104 may be disposed within the slot 120 prior to insertion of the card 116. As the card 116 is inserted into the apparatus 102, the shim 104 may be operable to receive the card 116 instead of the slot 120. As the card 116 translates in relation to the apparatus 102, the apparatus 102 may receive data 112 that has been encoded into one or more tracks 128 within the storage medium 118 of the card 116, wherein the one or more tracks 128 may be disposed along the storage medium 118. The one or more tracks 128 may be the physical location within the storage medium where data 112 has been encoded. In embodiments, each of the one or more tracks 128 may comprise different recording densities, wherein the recording density is the quantity of bits of data 112 per unit of length (e.g., 210 bits per inch). For example, one of the one or more tracks 128 may comprise a higher recording density than a subsequent tracks 128, where the track 128 with the higher recording density may contain more data 112 than the track 128 with a lower recording density. After receiving the data 112 from the one or more tracks 128, the apparatus 102 may be operable to then decode and store the received data 112.

As previously disclosed, the encryption chip 106 may be associated with the shim 104 and communicatively coupled to the apparatus 102. In other embodiments, the encryption chip 106 is incorporated into the apparatus 102 and operates concurrently with the apparatus 102. The encryption chip 106 may access the received data 112 stored in the apparatus 102 prior to the apparatus 102 transmitting the received data 112 over the communication network 108. The encryption chip 106 may be operable to encrypt the accessed, received data 112 with an algorithm to produce encrypted data 114. In response to the encryption chip 106 producing the encrypted data 114, the apparatus 102 is operable to transmit the encrypted data 114 to the external server 110 through the communication network 108.

In a different embodiment, the encryption chip 106 may encrypt the data 112 before the data 112 is processed by the apparatus 102. In this embodiment, as the card 116 is inserted into the shim 104 and translates in relation to the apparatus 102, the encryption chip 106 may receive data 112 that has been encoded into the storage medium 118 of the card 116. The encryption chip 106 may be operable to encrypt the received data 112 with an algorithm to produce encrypted data 114. The encryption chip 106 may then transmit the encrypted data 114 to the apparatus 102 for local storage and/or for transmission to the external server 110 through the communication network 108.

In another embodiment, the data 112 may be stored in a storage medium 118 disposed within a chip 130 in the card 116 rather than within the one or more tracks 128 on the card 116. The chip 130 may be an embedded integrated circuit chip capable of providing personal identification, authentication, data storage, application processing, and any combinations thereof. The card 116 comprising the storage medium 118 within the chip 130 may be configured to transmit data 112 to a terminal apparatus 102 that is chip-enabled.

Similar to the above embodiment with the one or more tracks 128, the card 116 comprising the chip 130 may be inserted into the apparatus 102. The apparatus 102 may be operable to access the storage medium 118 within the chip 130 and to receive the data 112 contained in that storage medium 118. In certain embodiments, the chip 130 may require verification by an authorized user of the card 116 for the transaction made with the card 116. The chip 130 may restrict access to the storage medium 118 until an input is entered through the apparatus 102 and verified by the chip 130. For example, the apparatus 102 may instruct the user to input a personal identification number or a zip code number associated with the card 116, transcribe a digital signature via the apparatus 102, or any combinations thereof. In response to the user providing the input prompted by the apparatus 102, the apparatus 102 may receive the data 112 stored in the storage medium 118 in the chip 130. After receiving the data 112 from the chip 130, the apparatus 102 may be operable to locally store the received data 112.

The encryption chip 106 may access the received data 112 stored in the apparatus 102 prior to the apparatus 102 transmitting the received data 112 over the communication network 108. The encryption chip 106 encrypts the accessed, received data 112 with an algorithm to produce encrypted data 114. In response to the encryption chip 106 producing the encrypted data 114, the apparatus 102 is operable to transmit the encrypted data 114 to the external server 110 through the communication network 108.

Alternatively, the encryption chip 106 may encrypt the data 112 before the data 112 is processed by the apparatus 102. In this embodiment, as the card 116 is inserted into the apparatus 102, the encryption chip 106 may receive the data 112 from the chip 130 after the chip 130 has verified the input entered into the apparatus 102. The encryption chip 106 may be operable to encrypt the received data 112 with an algorithm to produce encrypted data 114. The encryption chip 106 may then transmit the encrypted data 114 to the apparatus 102 for local storage and/or for transmission to the external server 110 through the communication network 108.

In one or more embodiments wherein the encryption chip 106 is associated with the shim 104, the encryption chip 106 may be configured to produce an alert 122 if the shim 104 is decoupled from the apparatus 102. The shim 104 may have previously been coupled to the apparatus 102 by an authorized user. In certain embodiments, such as for routine maintenance, that user may decouple the shim 104. In other embodiments, an unauthorized user (for example, a third-party bad actor) may decouple the shim 104 from the apparatus 102. As the shim 104 is decoupled in this scenario, the encryption chip 106 may be configured to produce the alert 122 for a period of time. The alert 122 may comprise at least one of a visual display, an audible noise, or combinations thereof. In response to the encryption chip 106 producing the alert 122, the apparatus 102 may inhibit further operations. The apparatus 102 may be configured to continue operations after a period of time, after the produced alert 122 has ended, once a signal is received from the encryption chip 106, or any combination thereof. In one or more embodiments, the apparatus 102 may be operable to display through a user interface (e.g., a display) that further operations of the apparatus 102 have been inhibited.

Example Received Data and Encrypted Data

FIG. 2 illustrates a table 200 of the example received data 112 and encrypted data 114 using the system 100 of FIG. 1. The encryption chip 106 (referring to FIG. 1) is operable to use an algorithm to produce the encrypted data 114, as shown in the left-hand column on FIG. 2, from the received data 112, as shown in the right-hand column on FIG. 2. In a particular embodiment, the storage medium 118 (referring to FIG. 1) containing the encoded data 112 (referring to FIG. 1) received by the apparatus 102 (referring to FIG. 1) may be a magstripe disposed on the card 116 (referring to FIG. 1), wherein data 112 encoded into the magstripe is contained in one or more tracks 128 (referring to FIG. 1). The storage medium 118 may contain encoded data 112 associated to an individual user. Without limitations, the encoded data 112 may include personal information of the individual user, such as name, credit card account number, expiration date, security code, zip code, or combinations thereof. The apparatus 102 may be operable to receive data 112 from each of the one or more tracks 128, and the encryption chip 106 is configured to encrypt the received data 112 from each of the one or more tracks 128. In other embodiments, the encryption chip 106 is operable to receive data 112 from each of the one or more tracks 128, produce the encrypted data 114, and transmit the encrypted data 114 to the apparatus 102 for local storage and/or transmission to the external server 110 (referring to FIG. 1).

In another embodiment, the apparatus 102 may receive data 112 from the storage medium 118 within the chip 130 (referring to FIG. 1). Similar to the above embodiment, the data 112 stored in the chip 130 may be associated to an individual user. The apparatus 102 may be operable to receive data 112 from the chip 130 upon verification, by the chip 130, of an input entered into the apparatus 102, and the encryption chip 106 is configured to encrypt the received data 112. In other embodiments, the encryption chip 106 is operable to receive data 112 from the chip 130 after the apparatus 102 receives the verified input, produce the encrypted data 114, and transmit the encrypted data 114 to the apparatus 102 for local storage and/or transmission to the external server 110.

Any suitable algorithm may be employed by the encryption chip 106 to produce the encrypted data 114. In certain embodiments, the algorithm may be a symmetric encryption algorithm. For example, the symmetric encryption algorithm may be a data encryption standard (DES) algorithm, a triple data encryption standard (TDES) algorithm, an advanced encryption standard (AES) algorithm, a Twofish standard algorithm, or a Blowfish standard algorithm, or any combination thereof. In other embodiments, the algorithm may be an asymmetric encryption algorithm. For example, the asymmetric encryption algorithm may be a Rivest-Shamir-Adleman (RSA) encryption algorithm, digital signature algorithm (DSA), or an elliptic curve cryptography (ECC) algorithm, or any combination thereof. During operations wherein the encryption chip 106 utilizes an asymmetric encryption, the apparatus 102 may be operable to receive a public key from the external server 110 to be used by the encryption chip 106 for producing the encrypted data 114. The encryption chip 106 may utilize the public key as an input to the algorithm to encrypt the received data 112 from the storage medium 118. In further operations, the encrypted data 114 may be decrypted using a corresponding algorithm related to that of the algorithm used by the encryption chip 106.

Example Apparatus

FIG. 3 is an example of the apparatus 102 of FIG. 1. The apparatus 102 may include a processor 302, a memory 304, and a network interface 306. The apparatus 102 may be configured as shown or in any other suitable configuration.

The processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304 and the network interface 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-2 and 4. In some embodiments, the function described herein is implemented using logic units, FPGAs, ASICs, DSPs, or any other suitable hardware or electronic circuitry.

The memory 304 is operable to store any of the information described with respect to FIGS. 1-2 and 4 along with any other data, instructions, logic, rules, or code operable to implement the function(s) described herein when executed by processor 302. For example, the memory 304 may store the encrypted data 308, code for application(s) 310, and/or software instructions 312, which are described below with respect to FIG. 4. The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

As illustrated in FIG. 3, the memory 304 may be communicatively coupled to and in signal communication with an encryption processor 314 of the encryption chip 106 (referring to FIG. 1). Similar to the processor 302, the encryption processor 314 comprises one or more processors operably coupled to the memory 304 through a wireless or wired connection. The encryption processor 314 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The encryption processor 314 may be a programmable logic device, a microcontroller, a microprocessor, or any suitable combination of the preceding. The one or more processors are configured to process data and may be implemented in hardware or software. For example, the encryption processor 314 may be 8-bit, 16-bit, 32-bit, 64-bit or of any other suitable architecture. The encryption processor 314 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-2 and 4. In some embodiments, the function described herein is implemented using logic units, FPGAs, ASICs, DSPs, or any other suitable hardware or electronic circuitry.

The network interface 306 is configured to enable wired and/or wireless communications. The network interface 306 is configured to communicate data between the apparatus 102 and other network devices, systems, or domain(s). For example, the network interface 306 may comprise a WIFI interface, a local area network (LAN) interface, a wide area network (WAN) interface, a modem, a switch, or a router. The processor 302 is configured to send and receive data using the network interface 306. The network interface 306 may be configured to use any suitable type of communication protocol as would be appreciated by one of ordinary skill in the art.

Example Operation of the Apparatus with Encryption Chip

FIG. 4 is a flow diagram illustrating an example method 400 of the system 100 of FIG. 1. The method 400 may be implemented using the apparatus 102 of FIG. 1 and the encryption chip 106 of FIG. 1. The method 400 may begin at step 402 where a user may insert an object, such as the card 116 (referring to FIG. 1), containing the storage medium 118 (referring to FIG. 1) into the apparatus 102. The shim 104 (referring to FIG. 1) may be coupled to the apparatus 102 and disposed within the slot 120 (referring to FIG. 1) of the apparatus 102. As the card 116 is inserted into the apparatus 102, the shim 104 may be configured to receive at least a portion of the card 116, wherein the portion comprises the storage medium 118. In certain examples, the storage medium 118 may be the magstripe comprising one or more tracks 128. In others, the storage medium 118 may be within the chip 130 (referring to FIG. 1) embedded in the card 116.

At step 404, in a first embodiment, the processor 302 (referring to FIG. 3) of the apparatus 102 may receive and decode data 112 (referring to FIG. 1) encoded into the storage medium 118. In one or more embodiments where the data 112 is stored in the one or more tracks 128, the motion of translating the card 116 in relation to the slot 120 changes a nearby magnetic field. The change in the nearby magnetic field may induce a voltage within the apparatus 102, wherein the voltage is correlated to the configuration of the encoded data 112 of the storage medium 118. The processor 302 may be operable to decode the received data 112 from the storage medium 118 based on the induced voltage signal. As disclosed above, the storage medium 118 may contain the encoded data 112 in one or more tracks 128 (referring to FIG. 1). The processor 302 may be operable to receive data 112 from each of the one or more tracks 128 and decode the received data 112. In one or more embodiments were the data 112 is stored in the chip 130, the apparatus 102 may prompt a user to enter an input when the card 116 is inserted. Upon verification, the apparatus 102 may receive the data 112 from the chip 130.

In a second embodiment, the encryption chip 106 may receive the data 112 before the data 112 is processed by the apparatus 102. In this embodiment, as the card 116 is inserted into the shim 104 and translates in relation to the apparatus 102, the encryption chip 106 may receive data 112 that has been encoded into the storage medium 118 of the card 116. Similar to operations of the processor 302, the encryption processor 314 (referring to FIG. 3) of the encryption chip 106 may be operable to decode the received data 112 from the storage medium 118 based on the induced voltage signal produced from the change in the nearby magnetic field when the card 116 translates in relation to the apparatus 102. In other embodiments where the data 112 is stored in the chip 130, the encryption chip 106 may receive the data 112 from the chip 130 after the apparatus 102 has received the input verified by the chip 130. The encryption chip 106 may be operable to encrypt the received data 112 with an algorithm to produce encrypted data 114. The encryption chip 106 may then transmit the encrypted data 114 to the apparatus 102 for local storage and/or for transmission to the external server 110 through the communication network 108.

At step 406, with reference to the first embodiment, the processor 302 may transmit to the memory 304 (referring to FIG. 3) of the apparatus 102 the received data 112 from the storage medium 118. The memory 304 may be operable to store the received data 112. The encryption processor 314 of the encryption chip 106 may be communicatively coupled to the memory 304 of the apparatus 102. The encryption processor 314 may be operable to access the received data 112 stored in the memory 304 of the apparatus 102. Once the encryption processor 314 accesses the received data 112, the encryption processor 314 may be further configured to encrypt the received data 112 with an algorithm to produce encrypted data 114. In one or more embodiments, the algorithm may utilize a public key received by the apparatus 102 from the external server 110 (referring to FIG. 1), wherein the public key is stored in the memory 304 and utilized for decryption in further operations. The encryption processor 314 may be operable to instruct the memory 304 to store the encrypted data 114, to remove the received data 112 from storage, or combinations thereof.

Referring to the second embodiment discussed above, the encryption processor 314 may be operable to encrypt the received data 112 with an algorithm to produce encrypted data 114 instead of the apparatus 102 receiving data 112. The encryption processor 314 may then transmit the encrypted data 114 to the memory 304 of the apparatus 102 for local storage.

At step 408, with reference to either the first or second embodiments, the processor 302 may be communicatively coupled to the communication network 108 (referring to FIG. 1). In one or more embodiments, the external server 110 may additionally be communicatively coupled to the communication network 108. The processor 302 may transmit the encrypted data 114 produced by the encryption processor 314 to the external server 110 via the communication network 108, wherein the external server 110 may be instructed, by the processor 302, to store the encrypted data 114 in the memory 124 (referring to FIG. 1) for further operations (e.g., decryption by a preapproved user to transform the encrypted data 114 into a usable format). Once the external server 110 receives the encrypted data 114, the method 400 proceeds to end.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for producing and transmitting encrypted data from data encoded on a storage medium, comprising:
    an apparatus configured to receive the storage medium, the apparatus comprising a processor, a memory, and a network interface, wherein the processor is communicatively coupled to the memory and configured to:
        receive data from the storage medium, wherein the received data is encoded into the storage medium;
        decode the received data as the storage medium is at least partially inserted into the apparatus; and
        transmit the received data to the memory for storage; and
    an encryption chip communicatively coupled to the apparatus, wherein the encryption chip is coupled to a shim, wherein the shim is disposed within and removably secured to a slot of the apparatus, wherein both the shim and the slot are configured to receive the storage medium as the storage medium is inserted into the shim, wherein a width of the shim is less than or equal to a width of the slot, the encryption chip comprising an encryption processor configured to:
        access the received data stored in the memory of the apparatus;
        encrypt the received data with an algorithm to produce the encrypted data; and
        produce an alert if the shim is decoupled from the apparatus by an unauthorized user;
    wherein the processor of the apparatus is further configured to:
        transmit the encrypted data to an external server communicatively connected to a communication network; and
        inhibit operation of the apparatus in response to receiving the produced alert from the encryption processor.

2. The system of claim 1, wherein the encryption chip is incorporated into the apparatus.

3. The system of claim 1, wherein the processor of the apparatus is further configured to:
    receive a public key from the external server to be used by the encryption processor with the algorithm for producing the encrypted data; and
    transmit the public key to the memory for storage;
    wherein the encryption processor is further configured to:
    access the public key stored in the memory of the apparatus; and
    utilize the public key as an input to the algorithm to encrypt the received data from the storage medium.

4. The system of claim 1, wherein the encryption chip is communicatively coupled to the memory and the processor of the apparatus through a wireless or wired connection.

5. The system of claim 1, wherein the storage medium is a magstripe disposed on a card, wherein data encoded into the magstripe is contained in one or more tracks, wherein the processor of the apparatus is further configured to receive data from each of the one or more tracks, wherein the encryption processor is further configured to encrypt the received data from each of the one or more tracks.

6. A method for producing and transmitting encrypted data from data encoded on a storage medium, comprising:
receiving data from the storage medium as the storage medium is at least partially inserted into an apparatus configured to receive the storage medium, wherein the received data is encoded into the storage medium;
decoding the received data from the storage medium by a processor of the apparatus;
transmitting the received data to a memory of the apparatus for storage;
accessing, by an encryption processor of an encryption chip, the received data stored in the memory of the apparatus, wherein the encryption chip is communicatively coupled to the apparatus and is coupled to a shim, wherein the shim is disposed within and removably secured to a slot of the apparatus, wherein both the shim and the slot are configured to receive the storage medium as the storage medium is inserted into the shim, wherein a width of the shim is less than or equal to a width of the slot;
encrypting, by the encryption processor, the received data with an algorithm to produce the encrypted data;
transmitting the encrypted data to an external server communicatively connected to a communication network with the processor of the apparatus;
producing an alert through the encryption chip if the shim is decoupled from the apparatus by an unauthorized user; and
inhibiting operation of the apparatus in response to producing the alert.

7. The method of claim 6, wherein the encryption chip is incorporated into the apparatus.

8. The method of claim 6, further comprising:
receiving a public key from the external server to be used by the encryption processor with the algorithm for producing the encrypted data;
transmitting the public key to the memory for storage;
accessing the public key stored in the memory of the apparatus with the encryption processor; and
utilizing the public key as an input to the algorithm to encrypt the received data from the storage medium.

9. The method of claim 6, wherein the encryption chip is communicatively coupled to the memory and the processor of the apparatus through a wireless or wired connection.

10. The method of claim 6, wherein the storage medium is a magstripe disposed on a card, wherein data encoded into the magstripe is contained in one or more tracks, further comprising:
receiving data from each of the one or more track by the processor of the apparatus; and
encrypting the received data from each of the one or more tracks with the encryption processor.

11. A non-transitory computer-readable medium comprising instructions that, when executed by a processor of an apparatus configured to receive a storage medium and an encryption processor of an encryption chip that is communicatively coupled to the apparatus, cause the processor to:
receive data from the storage medium, wherein the received data is encoded into the storage medium;
decode the received data as the storage medium is at least partially inserted into the apparatus;
transmit the received data to a memory of the apparatus for storage;
access the received data stored in the memory of the apparatus;
encrypt the received data with an algorithm to produce the encrypted data;
transmit the encrypted data from the encryption chip to an external server communicatively connected to a communication network, wherein the encryption chip is coupled to a shim, wherein the shim is disposed within and removably secured to a slot of the apparatus, wherein both the shim and the slot are configured to receive the storage medium as the storage medium is inserted into the shim, wherein a width of the shim is less than or equal to a width of the slot;
produce an alert if the shim is decoupled from the apparatus by an unauthorized user; and
inhibit operation of the apparatus in response to producing the alert.

12. The non-transitory computer-readable medium of claim 11, wherein the produced alert comprises at least one of a visual display and an audible noise.

13. The non-transitory computer-readable medium of claim 11, wherein the instructions further cause the processor to:
receive a public key from the external server to be used by the encryption processor with the algorithm for producing the encrypted data;
transmit the public key to the memory for storage;
access the public key stored in the memory of the apparatus; and
utilize the public key as an input to the algorithm to encrypt the received data from the storage medium.

14. The non-transitory computer-readable medium of claim 11, wherein the storage medium is a magstripe disposed on a card, wherein data encoded into the magstripe is contained in one or more tracks, wherein the instructions further cause the processor to:
receive data from each of the one or more tracks; and
encrypt the received data from each of the one or more tracks.

15. The non-transitory computer-readable medium of claim 11, wherein the encryption chip is communicatively coupled to the memory and the processor of the apparatus through a wireless or wired connection.

* * * * *